United States Patent [19]
Bruckert et al.

[11] Patent Number: 5,548,808
[45] Date of Patent: Aug. 20, 1996

[54] METHOD FOR PERFORMING A HANDOFF IN A COMMUNICATION SYSTEM

[75] Inventors: Eugene J. Bruckert, Arlington Heights; Richard J. Vilmur, Palatine, both of Ill.

[73] Assignee: Motorola, Inc., Schaumburg, Ill.

[21] Appl. No.: 162,922

[22] Filed: Dec. 8, 1993

[51] Int. Cl.⁶ ........................................ H04Q 7/00
[52] U.S. Cl. .................. 455/33.2; 455/33.1; 455/54.1; 455/56.1; 379/59; 379/60
[58] Field of Search .................. 455/33.2, 54.1, 455/56.1, 33.1, 33.4, 54.2; 379/60, 59

[56] References Cited

U.S. PATENT DOCUMENTS

| | | | |
|---|---|---|---|
| 5,056,109 | 10/1991 | Gilhousen et al. | 375/1 |
| 5,067,171 | 11/1991 | Kawano | 455/33 |
| 5,101,503 | 3/1992 | Furuya | 455/34.1 |
| 5,175,867 | 12/1992 | Wejke et al. | 455/33.1 |
| 5,230,082 | 7/1993 | Ghisler et al. | 455/33.2 |
| 5,239,667 | 8/1993 | Kanai | 455/10 |
| 5,265,263 | 11/1993 | Ramsdale et al. | 455/33.2 |
| 5,267,261 | 11/1993 | Blakeney, II et al. | 375/1 |
| 5,293,643 | 3/1994 | Israelsson | 455/33.2 |
| 5,303,289 | 4/1994 | Quinn | 379/60 |
| 5,329,574 | 7/1994 | Nielson et al. | 379/58 |

OTHER PUBLICATIONS

Microwave Mobile Communications, edited by William C. Jakes, Jr., A Wiley–Interscience Publication, 1974 by Bell Telephone Labs, Inc.

Primary Examiner—Reinhard J. Eisenzopf
Assistant Examiner—Lee Nguyen
Attorney, Agent, or Firm—Raymond J. Warren

[57] ABSTRACT

The power of a first signal is measured and is compared with a threshold. If the first signal power meets a handoff threshold, the system enters the handoff procedure. Once in the handoff procedure, estimates of a first signal quality a signal would have, if transmitted from the first site to the subscriber, and a second signal quality a signal would have, if transmitted from the second site to the subscriber, are determined. If the estimated first signal quality meets a transmit threshold, the first will activate a traffic signal to the subscriber. If the estimated first or second signal quality fails to meet the transmit threshold, the first or second, respectively, will terminate its traffic signal to the subscriber, but the transmission resources will remain dedicated to the subscriber. If the estimated first or second signal quality fails to meet the handoff threshold, the first or second, respectively, will discontinue serving the subscriber.

4 Claims, 5 Drawing Sheets

5,548,808

METHOD FOR PERFORMING A HANDOFF IN A COMMUNICATION SYSTEM

RELATED INVENTIONS

The present invention is related to the following inventions, all assigned to the assignee of the present invention:

Method for Controlling Transmission During Handoff in a Communication System, invented by Scott Hall, having U.S. Ser. No. 08/137,334, and filed on Oct. 18, 1993.

FIELD OF THE INVENTION

The present invention relates, in general, to communication systems and, more particularly, to a method for performing handoff in a communication system.

BACKGROUND OF THE INVENTION

There are a number of different methods of conducting handoff in a cellular system. Handoff is the act of transferring a call with a subscriber (e.g., mobile, portable, etc.) from one transceiver, a source transceiver, to a second transceiver, a target transceiver. In frequency division multiple access (FDMA) systems when a call is handed from one transceiver to another, the connection to the first transceiver is broken and quickly established with a second transceiver. While handoffs can be performed quickly, the quality suffers during handoff and connections can be missed; resulting in calls being dropped.

To resolve these types of problems, the ideas of soft and softer handoffs were developed. A soft handoff is a handoff between one site and another. A softer handoff is a handoff between one sector and another sector, both located at the same site. The basic concept of soft/softer handoff is that the connection is established with the second transceiver before the connection with the first transceiver is broken.

The implementation of the present invention will be described in conjunction with direct sequence code division multiple access (DS-CDMA) systems, but is not limited to those applications. In DS-CDMA systems, the transmissions of a plurality of signals are carried over the same spectral resource. The typical spectral resource is a wide band (1.2 MHz) system. However, there are also narrow band (9.6 KHz and 200 KHz) systems that are being implemented. The transmitted signals are spread throughout the band, using a known code. This same code is then used by the receiver to despread the signal.

The limitation on the number of signals which can be carried in the band is closely associated with the total power of the signals in the band. A more detailed description of power control in DS-CDMA systems is provided in U.S. patent applications: "Method for Compensating for Capacity Overload in a Spread Spectrum Communication System" having Ser. No. 07/783,751 filed on Oct. 28, 1991; and "A Method for Controlling Transmission Power in a Communication System" having Ser. No. 07/907,072 filed on Jul. 1, 1992, both assigned to the present assignee.

While the soft/softer handoff techniques provide a higher quality signal to the receiver, it is at the expense of overall system capacity. When multiple transmitters are transmitting the same signal, excess power is being put into the system. This excess power reduces the number of subscribers which the system can accommodate.

This problem has been illustrated in current test systems in which it has been shown that 50% to 60% of the subscribers in the system are in handoff mode. From a system standpoint, one-third or more of the system transmit power is not being utilized by the subscribers. Instead, this excess power is only adding to the noise.

DETAILED DESCRIPTION OF THE DRAWINGS

Figure 1:
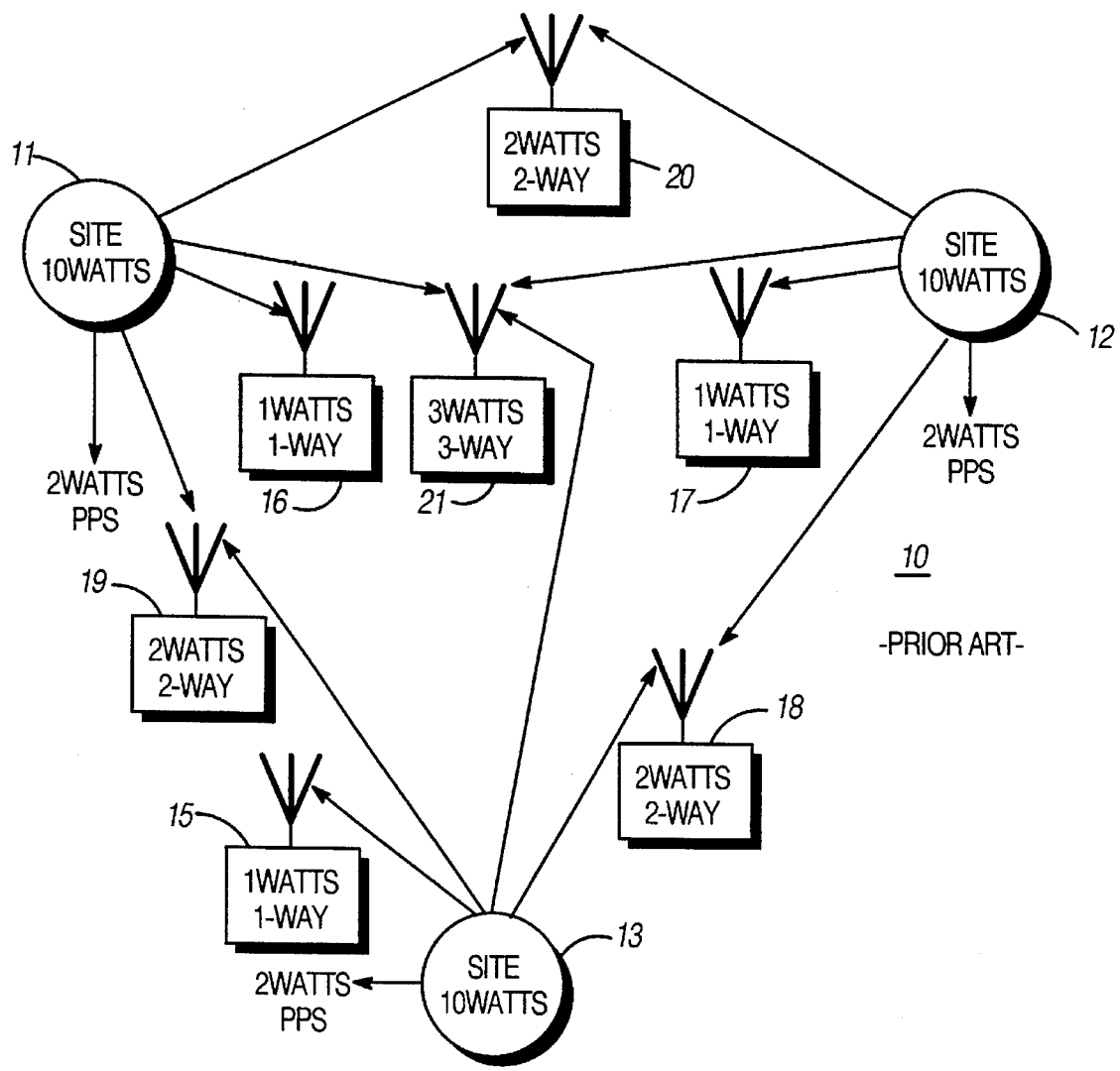
FIG. 1 is a system diagram illustrating a prior art handoff technique.

Referring initially to FIG. 1, a prior art communication system, generally designated 10, is illustrated. It should be noted here that while an omni-directional system is illustrated for simplicity, this also applies to sectorized sites. System 10 is a DS-CDMA system having three sites 11–13. Each site has 10 watts of power to use for transmission of signals. It should be noted here, that the 10 watts of power per site is used as an example and that a typical site may operate at 100 watts or more. Within system 10 is a plurality of subscribers 15–21, each receiving a signal from one or more of sites 11–13.

Each site 11–13 has 2 watts of power dedicated for pilot, page, and synchronization (PPS) signals which are used to transmit general broadcast and common control channels. When a subscriber is attempting to access the system, it will first acquire these PPS signals to receive access instructions. The 2 watts of power used for these signals comprises 20% of the total power available from a site. The remaining 80% of the power is available for direct communication with system users on traffic channels.

In system 10 three of the subscribers (15–17) are within the coverage area of individual sites. These are designated as 1-way subscribers. The respective sites each expend 1 watt of power transmitting to these 1-way subscribers. (N.B. the specific power level is set for the particular subscriber based on a signal quality measure). Subscribers 18–20 have entered a region between sites where handoff procedures have been commenced. These subscribers are labeled 2-way subscribers. Here, because of the distance and co-channel interference from the other sites, each site transmitting to a 2-way user is using 2 watts of power. For example, site 11 transmits to subscriber 20 using 2 watts of transmit power at the same time site 12 transmits to subscriber 20 using 2 watts of power. From a system perspective, 1 watt of transmit power is used to communicate with subscriber 16, whereas 4 watts of power is used to communicate with subscriber 20.

The final user, subscriber 21, is a 3-way user located in an area covered by all three sites. Each site 11–13 is in contact with subscriber 21 and, again because of the distance and co-channel interference, each site uses 3 watts of transmit power to communicate with subscriber 21. Therefore, 9 watts of system power is being expended to communicate with subscriber 21 as compared to one watt for subscribers 15–17.

A subscriber enters a handoff procedure when it enters an area where signals transmitted from one or more sites have relatively the same strength as received by the subscriber. Using a mobile assisted handoff (MAHO) technique as an example, the subscriber periodically measures signals from sites previously identified by the system. For example, subscriber 21 would have been directed to measure a signal characteristic of transmissions from the potential target sites 11 and 13. The signal measured will be an overhead signal such as the PPS. The characteristic measured could be any number of quality measures such as: received signal strength indicator (RSSI), frame error rate (FER), etc. When subscriber 21 has reached a point where the signal from site 11 is within a certain level (e.g. 8 dB) of the signal from site 12 then handoff will be implemented and both sites will begin serving subscriber 21. Likewise, when the signal from site 13 is within that level, site 13 will also begin transmitting to subscriber 21.

In application, even though all three sites (11–13) are transmitting to subscriber 21, subscriber 21 may only be receiving one of the transmissions, the other ones being too weak as compared with the best signal. This means that, with regard to subscriber 21, either 3 or 6 watts of system power is being wasted in that this power being pumped into the system raises the received noise level ($N_o$) for the system and does not contribute to signal detection improvement. In general, a higher system $N_o$ results in the power to each of the other subscribers in the system being increased to compensate, resulting in fewer users being permitted on the system.

Figure 2:
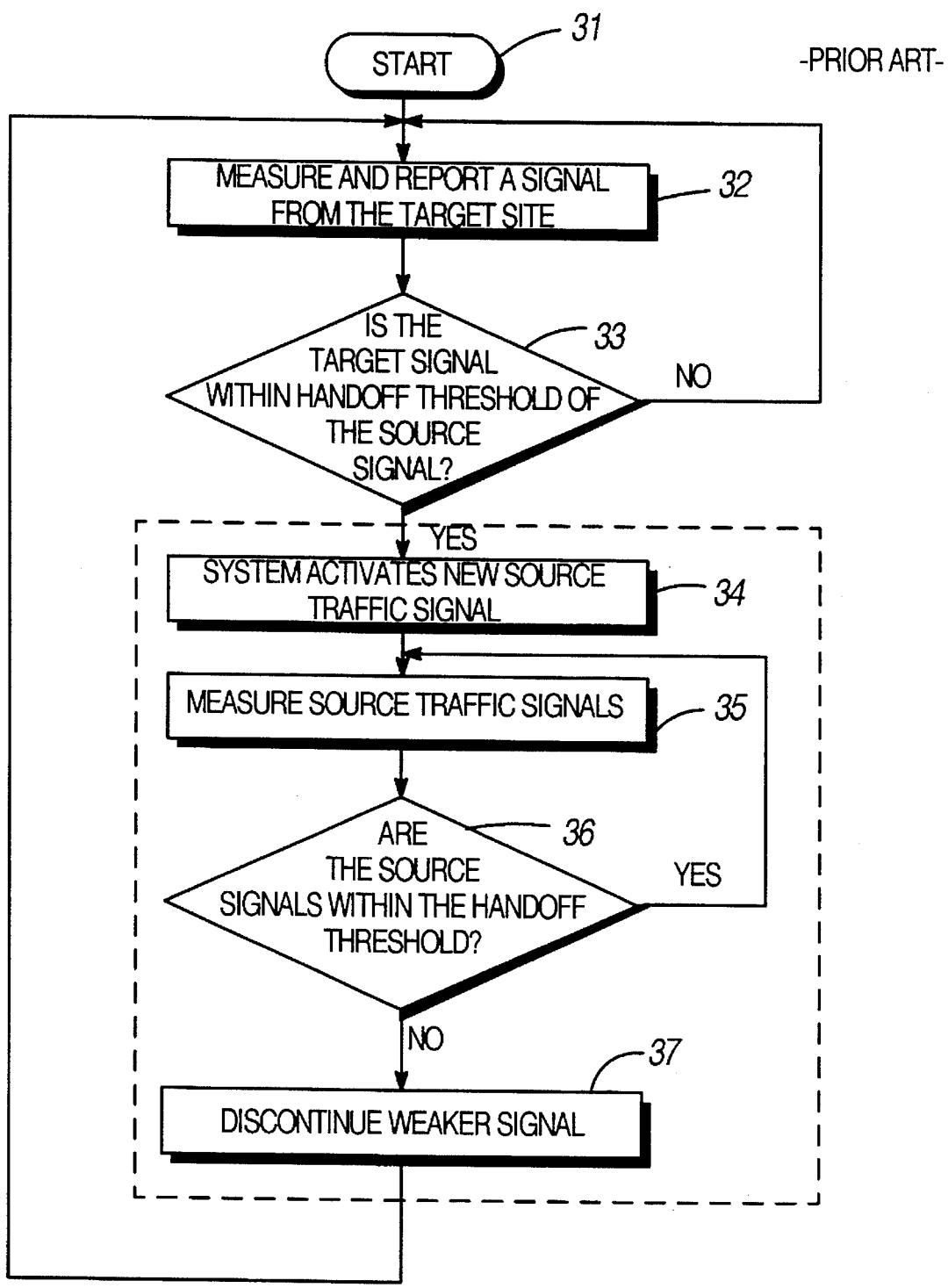
FIG. 2 is a flow chart of a prior art handoff method.

Referring now to FIG. 2, a flow chart, generally designated 30, illustrating a prior art handoff process is shown. Process 30 commences at start step 31 and measures a signal from a target site, step 32. The measurements are reported periodically to the base where handoff decisions are made. If the target signal is not within a threshold value, in this example 8 dB, of the source signal, the process 30 loops back to step 32. If the target signal is within the threshold value, then the target will become a source site and the subscriber will enter handoff, subprocess 39.

In handoff subprocess 39, the system activates a traffic channel from the new source site, step 34. The subscriber unit will then measure PPS signals from both sources, step 35. If the two signals are within a handoff threshold, then subprocess 39 loops back to step 35. If one of the two signals is not within the handoff threshold for a predetermined period of time, the mobile station reports this to the system. The system would then discontinue transmission of the weaker traffic signal, step 37. If more than two sites are involved, it is determined if the weaker signals are within the handoff threshold of the strongest signal.

A drawback of the prior art is that even though multiple signals will be transmitted to a user during handoff, often only one of those signals will be processed by the receiving unit. For example, subscriber 19 is currently being serviced by sites 11 and 13. If the signal transmitted from site 11 is at −100 dBm at subscriber 19 and the signal transmitted from site 13 is at −110 dBm at subscriber 19, then subscriber 19 will process the signal transmitted from site 11 and not the signal from site 13. This occurs because there is enough difference in the signals such that the signal from site 13 is below the noise level as compared with the signal from site 11. As a result, the power used to transmit the signal from site 13 was wasted power in that it added to the noise level of the other subscriber stations, thereby reducing the capacity of the overall system, without contributing to the demodulation process of subscriber 19.

Figure 3:
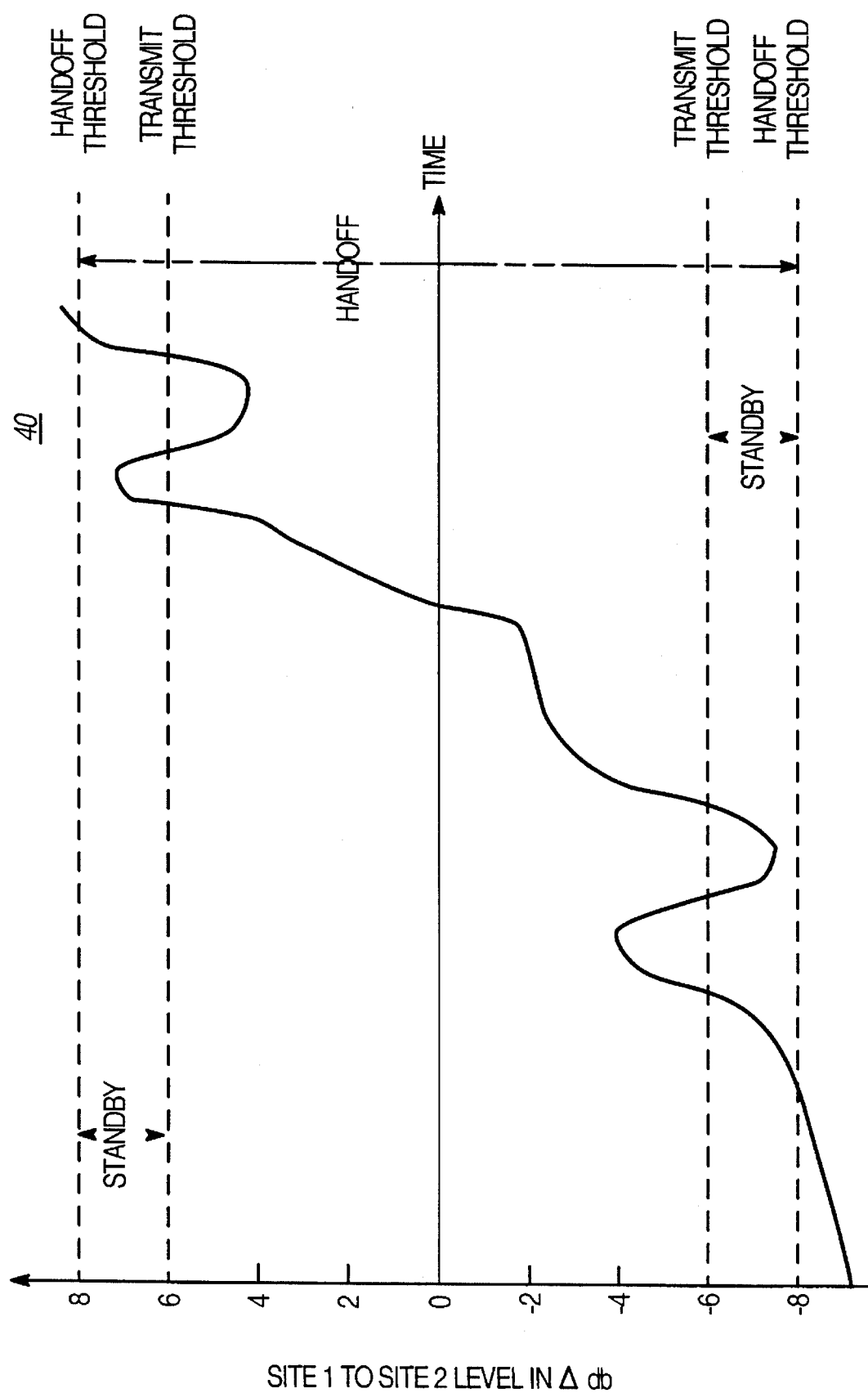
FIG. 3 is a line chart illustrating the operation of a handoff process embodying the present invention.

In the present invention, the handoff procedure will commence as above, but the transmissions from multiple sites will not begin until a transmission threshold is met. This is illustrated by the line graph, generally designated 40, of FIG. 3. The line graph is a graph, in dB, of the difference between signals from two sites (target less source). At the handoff threshold where the target signal would be 8 dB less than the source signal, handoff is entered and resources at the target are allocated for the handoff, but no signal is transmitted. In other words, the target is placed in a standby mode. Once the difference between the signals reaches the transmission threshold (e.g. −6 dB), then the normal 2-way service is provided by transmitting signals from both sites (both now being source sites).

As the subscriber moves closer to one source site, the signal from that site will reach a point where it crosses the transmission threshold at the other end of the scale (6 dB). At this time, the other source site would become a target site and be placed in standby. As the subscriber unit continues to approach the remaining source site, the handoff threshold, 8 dB, will be exceeded and the target site will discontinue service. It should be noted here that the threshold levels for beginning handoff and entering standby do not necessarily have to be the same as the threshold levels for ending handoff or exiting standby. Nor do the thresholds need to be the same from site-to-site or sector-to-sector.

It should be understood that since subscriber units may not move directly from one site to another, the source and target sites may alternately move in and out of standby several times before the handoff procedure is completed.

As a further feature, system capacity may be increased by limiting the number of subscribers which can be placed in soft handoff. This limit may be determined by: limiting the amount of power from a particular site or sector which can be used for soft handoff; or setting a fixed number of subscribers to which soft handoff is provided. In either case, the system would select the subscribers which were in the greatest need of soft handoff and service them. This would result in some of the subscribers being provided slightly degraded service rather than removing system capacity to provide soft handoff. Ideally, all subscribers would still enter soft handoff for some period prior to a point where a hard handoff would become necessary.

Figure 4:
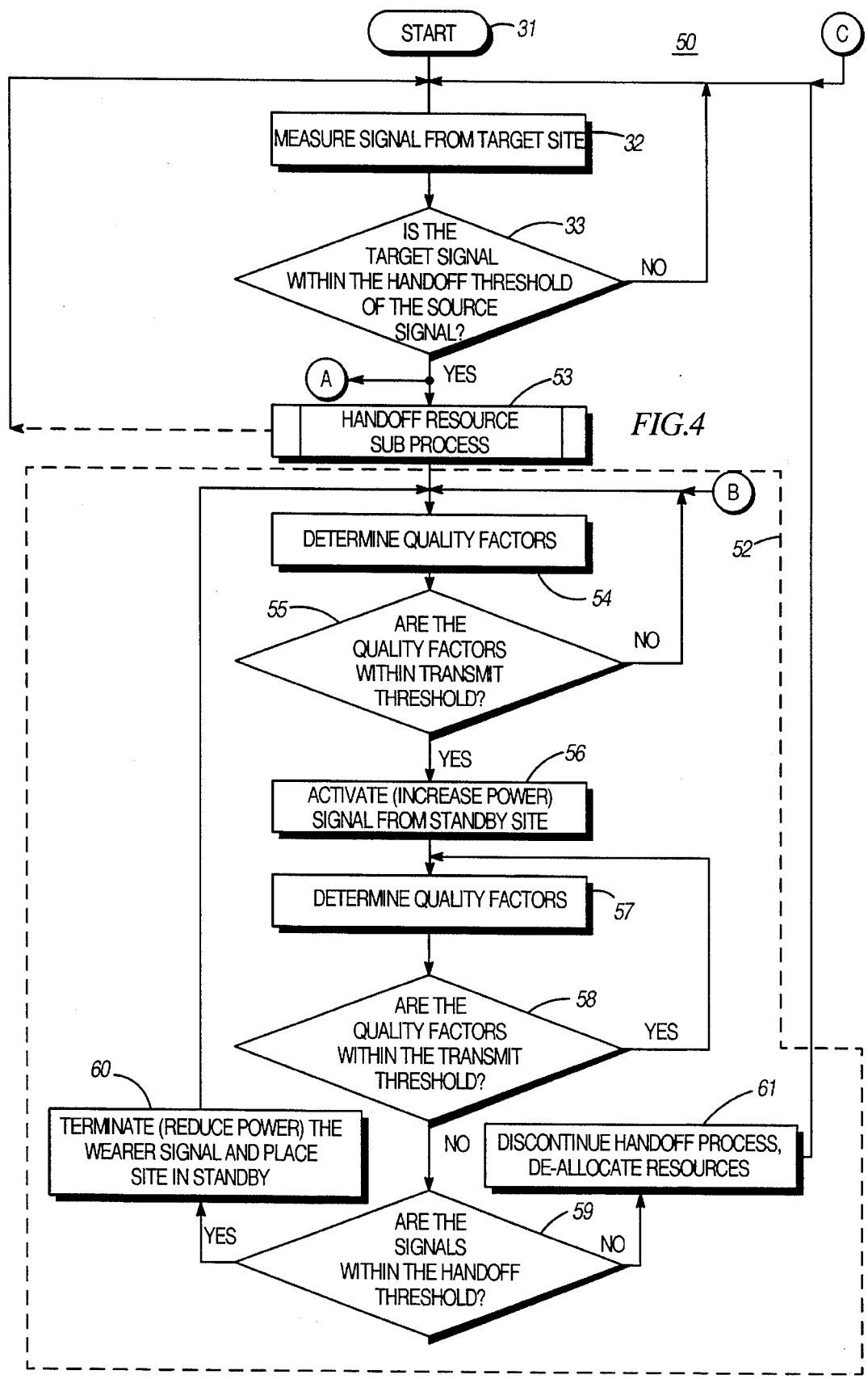
FIG. 4 is a flow chart illustrating a handoff process embodying the present invention.

Referring now to FIG. 4, a flow chart illustrating a process, generally designated 50, is shown. Process 50 commences at step 31 and measures the signal from the target site as in the prior art. Next, it is determined if the target signal is within the handoff threshold, decision step 33. If not, process 50 loops back to step 32. If the target signal is within the handoff threshold, process 50 enters subprocess 53, described in detail below, to determine if handoff resources are available. If resources are available, subprocess 52 is entered.

Once subprocess 52 is entered, the system sets up the handoff by allocating the appropriate resources at the target site. However, at this time, the target site is placed in standby and does not actually transmit a signal to the subscriber unit.

Next, quality factors are determined for the sites. These quality factors may be signal strength (RSSI), frame error rate (FER), carrier-to-noise ratio ($E_b/N_o$), or any other factor which indicates signal quality. It should be noted here that the term "frame error rate" is often used in place of "frame erasure rate". The distinction is that frames in which errors exist and are detected are erased frames. Frames in which errors exist but are not detected are still frame errors. However, the term "frame error rate" is often used in place of the term "frame erasure rate". In the absence of a real signal to measure, the quality factors of the various signals are estimated using other available data. This estimation will be described below.

Returning to process 50, once the quality factors are determined, they are compared to determine if they fall within a transmit threshold, decision step 55. If they are not within the transmit threshold, then subprocess 52 loops back to step 54. If the quality factors are within the transmit threshold, then the standby site is taken out of standby by activating the transmit signal, step 56. Alternatively, when the site is in standby, a very low power signal may be transmitted. Once the site is taken out of standby, the signal power is increased to a normal level.

When multiple signals are activated, the system continues to monitor the quality of the signals, step 57. Subprocess 52 then determines if the quality factors are still within the transmit threshold, decision step 58. If they are within the transmit threshold, then no change is made and subprocess 52 loops back to step 57. If the quality factors are not within the transmit threshold, then subprocess 52 determines if the signals are still within the handoff threshold, decision step 59. If not, then the handoff process is discontinued by de-allocating the resources at the weakest site, step 61, and the power of the remaining traffic channels are adjusted according to a predetermined rule. If the signals are still within the handoff threshold, then the weakest signal is terminated (or its power reduced) placing that site in standby, step 60. Subprocess 52 then loops back to step 54.

One particular method of estimating the received signal quality at the subscriber unit is to use the relative pilot signal strength and base station power information to estimate $E_b/N_o$ from each base station. Pilot channel signal strength is estimated by the subscriber when measuring the ratio $E_c/I_o$ where $E_c$ is the pilot channel energy per chip and $I_o$ is the total power at the output of the mobile station IF filter. If multiple time delays are present then the $E_c/I_o$'s are to be summed. These values are reported back to the base station. In an example where there are two pilot signal strengths reported back to the base station, they can be utilized in equation (1) to estimate the relative quality of the signals from the two sites.

$$\left(\frac{E_b}{N_o}\right)_1 / \left(\frac{E_b}{N_o}\right)_2 = \int \left[\left(\frac{E_c}{I_o}\right)_1 / \left(\frac{E_c}{I_o}\right)_2\right] \text{(pilotPwrAdjust)} \left[\frac{P_{o1} + x \ast P_{o2} + N_{th}}{P_{o2} + x \ast P_{o1} + N_{th}}\right] \quad (1)$$

Where:
- (pilotPwrAdjust) is the traffic channel-to-pilot channel ratios $[(P(TCH_1)/P(pilot_1))/(P(TCH_2)/P(pilot_2))]$ where $P(TCH_x)$ is the power of a Traffic CHannel (TCH) and $P(pilot_x)$ is the power of a pilot channel as known or measured by the Base Transceiver Station (BTS);
- $P_{o1}$ and $P_{o2}$ are the total transmitted power from site/sectors 1 and 2 respectively;
- x is a factor accounting for delay spread of the two signals; and
- Nth is a thermal noise power in the IF bandwidth.

Typically, the factors x and Nth are much less than 1 (x and Nth<<1) reducing equation (1) to equation (2).

$$\left(\frac{E_b}{N_o}\right)_1 / \left(\frac{E_b}{N_o}\right)_2 = \int \left[\left(\frac{E_c}{I_o}\right)_1 / \left(\frac{E_c}{I_o}\right)_2\right] \text{(pilotPwrAdjust)} \left[\frac{P_{o1}}{P_{o2}}\right] \quad (2)$$

The above reporting mechanism can be a Pilot Measurement Report Message found in Telecommunications Industry Association Interim Standard (IS) 95 or a 13 bit field in certain frames transmitted by the subscriber unit may be utilized. With a 13 bit field, the subscriber will send a pilot strength measurement message. The subscriber would report the strongest pilots using a trio of three-bit subfields in order of power. The pilot numbering is taken from their order of occurance in the pilot strength measurement message. The relative attenuation of the two weaker pilots is reported using a pair of two-bit subfields. Alternatively, the highest power pilot can be identified and those within a given range of the highest if a fixed range is sufficient. The fixed range may be preset or provided to the subscriber on a site-to-site or sector-to-sector basis.

In situations where the signal is changing too fast for the subscriber unit to report the Ec/Io to the BTS in a timely manner, the subscriber unit received TCH energy can be estimated at the base station using equation (3).

$$\left[\left(\frac{E_c}{I_o}\right)_1 / \left(\frac{E_c}{I_o}\right)_2\right] \text{(pilotPwrAdjust)} \approx \left[\Sigma\left(\frac{E_b}{N_o}\right)_1 / \Sigma\left(\frac{E_b}{N_o}\right)_2\right] \quad (3)$$

Where the summation ($\Sigma$) sign indicates a time average of the measurement.

This estimate is then used to determine when handoff is to be entered. If the estimate from equation (2 or 3) is less than the threshold (e.g. 8 dB) then handoff is entered.

The transmit threshold (k) can also be set as a function of speed. The speed can be determined by measuring the fading rate of the signal. The location where equations (1), (2), or (3) is calculated may be done at a common point (e.g. the BSC—Base Site Controller—if it is a soft HO—Hand Off—, or the BTS if it is a softer HO), autonomously at the BTS if it is designated to be a weaker signal, or via BTS-to-BTS communication. It is desirable to designate one (or more) base station(s) to be the strongest signal and all others as weaker. The weaker base stations may start or stop transmission to the subscriber as often as indicated by the process. The strongest base station must remain transmitting to the subscriber unit. The strongest base station is the one with the largest Eb/No at the subscriber unit.

A table, such as Table A below, where x represents speed can then be used to determine when handoff is entered for 800 to 900 MHz bands. Performance may very for other frequencies.

TABLE A

| SPEED | k |
|---|---|
| low (x < walking) | −2 dB |
| medium (walking ≦ x ≦ 20 mph) | −8 dB |
| high (x > 20 mph) | −5 dB |

In the case of low speed, after entering standby, the handoff would occur when the signal measurement from the target site is within 2 dB of the source site. At medium speed, handoff would occur when the signals were within 8 dB of each other and; at high speed when the signals were within 5 dB of each other. The levels for exiting handoff, going back to standby, may also be adjusted depending upon speed.

There are a number of processes known in the art to determine a relative movement of a subscriber. For example, see Jakes, "Microwave Mobile Communications", pg 35 (1974). In general, a slower moving subscriber will have more time to make a handoff than a faster moving subscriber. In the above example, FIG. 3, the transmission threshold was set at 6 dB. For a slower moving subscriber (e.g. pedestrian), the transmission threshold can be set to 2 dB. The number and level of these thresholds can be set at the discretion of the developer.

Figure 5:
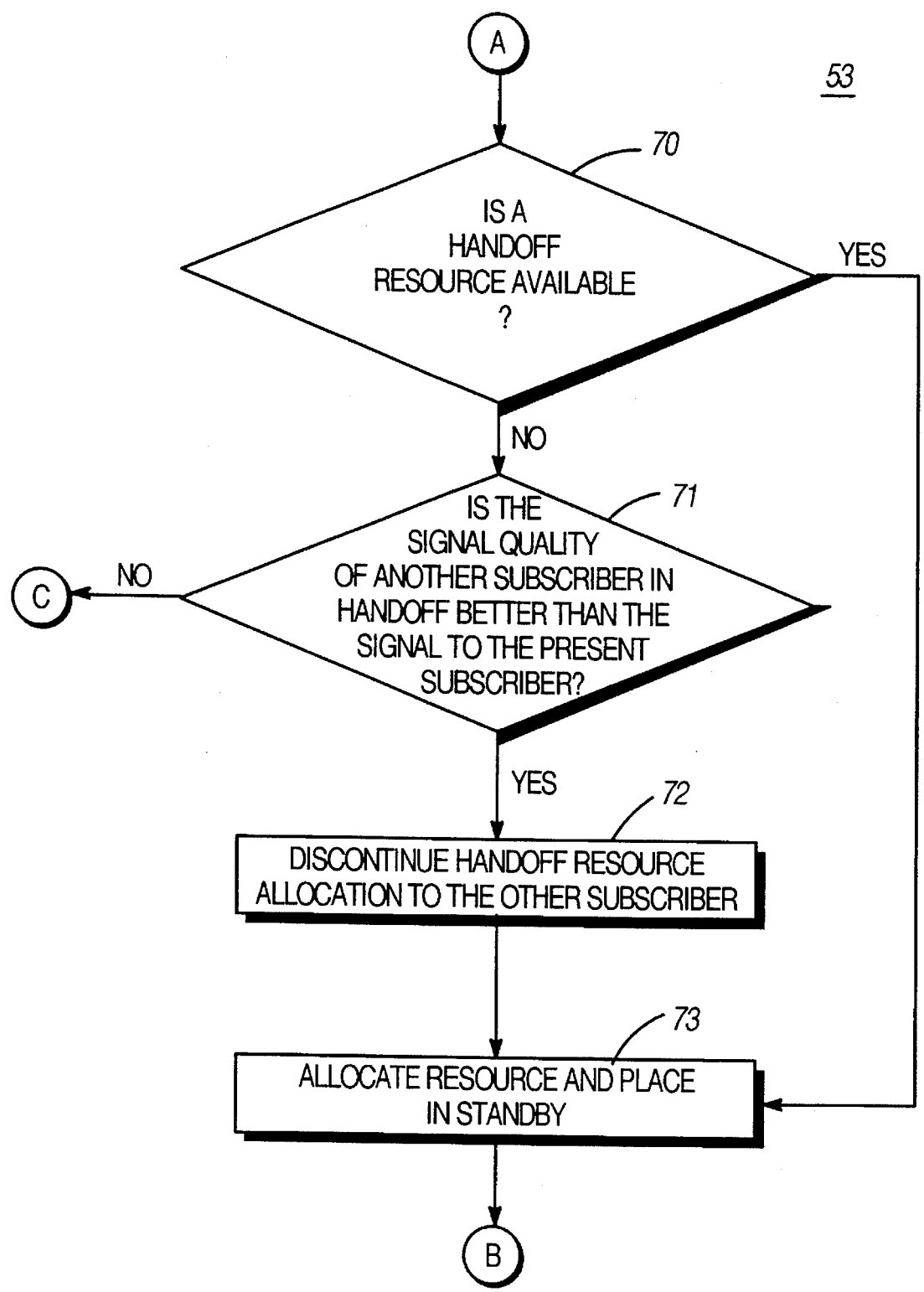
FIG. 5 is a flow chart illustrating a variation of the handoff process of FIG. 4.

Referring now to FIG. 5, subprocess 53 is illustrated in more detail. Following step 33, FIG. 4, it is determined if a handoff resource is available, step 70. If a resource is not available, then it is determined if the signal quality of another subscriber in handoff is better than the signal in the present subscriber, step 71. If there is no other subscriber in handoff with better signal quality, then subprocess 53 exits and returns to step 32, FIG. 4. If there is a subscriber with better signal quality, then the handoff resource allocation to that other subscriber is discontinued, step 72. Following step 73, or if a handoff resource was available, decision step 70, then the resource is allocated and placed in standby, step 73. Following step 72, subprocess 52 is entered.

The determination of whether a handoff resource is available, decision step 70, can be made in several ways. One way is to place a maximum on the amount of power allocated to subscribers in handoff. For example, a maximum of 30% of the site power could be dedicated to handoff. Another means of limiting the resources dedicated to subscribers in handoff is to limit the number of subscribers serviced under handoff situations. Either method will serve to reduce the amount of capacity allocated to handoff to a reasonable amount.

Thus, it will be apparent to one skilled in the art that there has been provided in accordance with the invention, a method for performing a handoff in a communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of performing a handoff in a communication system, said method comprising the steps of:

A) measuring a power of a first signal of a first site at a subscriber being served by a second site;

B) determining if said power of said first signal meets a handoff threshold;

C) entering a handoff procedure if said first signal meets said handoff threshold;

D) estimating a first signal quality for a signal transmitted from said first site received by said subscriber;

E) activating a traffic signal from said first site to said subscriber if said first signal quality estimated for said signal transmitted from said first site meets a transmit threshold;

F) terminating said traffic signal from said first site to said subscriber if said first signal quality estimated for said signal transmitted from said first site fails to meet said transmit threshold;

G) reactivating said traffic signal from said first site to said subscriber if said first signal quality estimated for said signal transmitted from said first site meets said transmit threshold;

H) estimating a second signal quality for a signal transmitted from a second site;

I) terminating a traffic signal from said second site to said subscriber if said second signal quality estimated for said signal transmitted from said second site fails to meet said transmit threshold;

J) measuring a power of said second signal of said second site at said subscriber;

K) determining if said power of said second signal of said second site meets said handoff threshold; and L) exiting said handoff procedure if said second signal of said second site fails to meet said handoff threshold.

2. The method of claim 1 wherein said step of measuring said power of said first signal is performed at said subscriber and said method further comprises the step of reporting an indication of said first signal meeting said threshold, if said signal meets said handoff threshold, to said second site.

3. The method of claim 1 wherein said step of estimating said first signal quality comprises the steps of:

measuring a pilot signal strength of each of a plurality of pilot signals on a plurality of pilot channels transmitted from a plurality of sites;

measuring a traffic signal strength of each of a plurality of traffic signals on a plurality of traffic channels transmitted from said plurality of sites; and estimating said first signal quality utilizing said pilot signal strength and said traffic signal strength of at least one of said plurality of sites.

4. A method of performing a handoff in a communication system, said method comprising the steps of:

A) measuring a power of a first signal of a first site at a first subscriber being served by a second site;

B) determining if said power of said first signal meets a handoff threshold;

C) entering a handoff procedure and determining if a handoff resource is available at said first site for communication with said subscriber if said first signal meets said handoff threshold unless a handoff capacity of said first site is exceeded;

D) determining if a second subscriber undergoing the handoff procedure has a signal quality better than said first signal if said handoff resource is unavailable;

E) discontinuing said handoff resource allocated to said second subscriber if said signal quality at said second subscriber is better than said first signal;

F) allocating said handoff resource to said first subscriber if said handoff resource is determined to be available or if said handoff resource allocated to said second subscriber is discontinued;

G) returning to step A unless said handoff procedure is entered;

H) estimating a first signal quality for a signal received by said first subscriber from said first site and a second signal quality for a signal received by said first subscriber from the second site;

I) activating a traffic signal from said first site to said first subscriber if said estimated first signal quality for said signal transmitted from said first site meets a transmit threshold; and J) terminating a traffic signal from said second site to said first subscriber if said second signal quality estimated for said signal transmitted from said second site fails to meet said transmit threshold.

\* \* \* \* \*